United States Patent [19]
Peat et al.

[11] Patent Number: 4,480,927
[45] Date of Patent: Nov. 6, 1984

[54] MIXING APPARATUS AND AUGER THEREFOR

[75] Inventors: Robert W. Peat; John L. Daniel, both of Garden City, Kans.

[73] Assignee: Butler Manufacturing Company, Kansas City, Mo.

[21] Appl. No.: 383,139

[22] Filed: May 28, 1982

[51] Int. Cl.³ .............................................. B01F 7/08
[52] U.S. Cl. .................... 366/299; 366/300; 366/318; 366/324; 366/325; 366/603
[58] Field of Search ............... 366/603, 64, 66, 299, 366/300, 318–325; 241/260.1; 198/662, 676

[56] References Cited

U.S. PATENT DOCUMENTS

| | | | |
|---|---|---|---|
| 24,134 | 5/1859 | McBean | 366/325 |
| 138,953 | 5/1873 | Strunz | 366/325 |
| 301,506 | 7/1884 | Massey | 198/676 |
| 836,066 | 11/1906 | Crocker | 366/318 |
| 885,109 | 4/1908 | Truss | 198/676 X |
| 1,013,612 | 1/1912 | Peters . | |
| 1,134,220 | 4/1915 | Nash . | |
| 2,309,418 | 1/1943 | Schweickart et al. | 198/676 X |
| 3,790,138 | 2/1974 | Neler . | |
| 3,804,377 | 4/1974 | Kugle et al. . | |
| 3,828,661 | 8/1974 | Vink . | |

FOREIGN PATENT DOCUMENTS

| | | | |
|---|---|---|---|
| 258884 | 4/1963 | Australia | 366/64 |
| 753366 | 1/1971 | Belgium | 241/260.1 |
| 2028151 | 3/1980 | United Kingdom | 366/603 |

Primary Examiner—Philip R. Coe
Attorney, Agent, or Firm—Kokjer, Kircher, Bradley, Wharton, Bowman & Johnson

[57] ABSTRACT

A mixing apparatus in which parallel augers are located in a box. The upper mixing augers have specially shaped flighting which provides straight edges linked by corners rather than the conventional helical edge. The lower conveying auger is a helically edged auger with notches at intervals along the edge providing radially oriented surfaces which assist in engaging the material.

The flighting of the special straight edged augers is produced from a square blank of sheet metal by pressing it into the spiral configuration required and attaching it to the auger shaft. The complete flighting is made up by several such sections joined end to end.

8 Claims, 6 Drawing Figures

MIXING APPARATUS AND AUGER THEREFOR

BACKGROUND OF THE INVENTION

This invention lies in the field of mixing equipment and deals more particularly with livestock feed mixers, and a special auger arrangement for such mixers.

It has become common practice in livestock feeding, particularly in bunk feeding at commercial feedlots and the like, to blend the ingredients of the feed in a box mixer, either stationary or mobile. The typical box mixer contains augers, paddle blades and other types of mixing components which are intended to operate on the ingredients of the feed to blend them into a substantially homogenous mass and on demand to assist in conveying and discharging the feed from the box so that all animals fed from the batch in the mixer will be provided a substantially uniform ration content.

Achieving uniformity of distribution of all the ingredients of the mix throughout the feed mass is difficult. In particular, the handling of roughage, which is normally of a stringy fibrous nature, provides problems in both mixing and conveying. Not only must the stringy roughage be blended uniformly into the feed, but it also must be effectively conveyed through the box and out through the discharge as part of an essentially continuous mass in which the uniformity of blend is maintained.

SUMMARY OF THE INVENTION

One of the principal features of the present invention is that it provides a mixer box in which the mixing and conveying of the roughage in particular is accomplished more effectively than in other arrangements of which I am aware. This feature is achieved through the provision of mixing and conveying augers for the box which are so configured so that the flighting is substantially continuous along the shaft yet is provided with corners which serve to engage the stringy fibrous components of the roughage to agitate the mix and pull the stringy material around the shaft to cause intimate mixing and blending. The continuous nature of the flighting also assures of movement of the mix, including the fibrous material, along the box without clamping so as to cooperate with other components to deliver it ultimately to the discharge conveyer.

Other and further features of the invention, together with the features of novelty appurtenant thereto, will appear in the course of the following description.

DETAILED DESCRIPTION

In the accompanying drawings, which form a part of the specification and in which like reference numerals indicate like parts in the various views.

Figure 1:
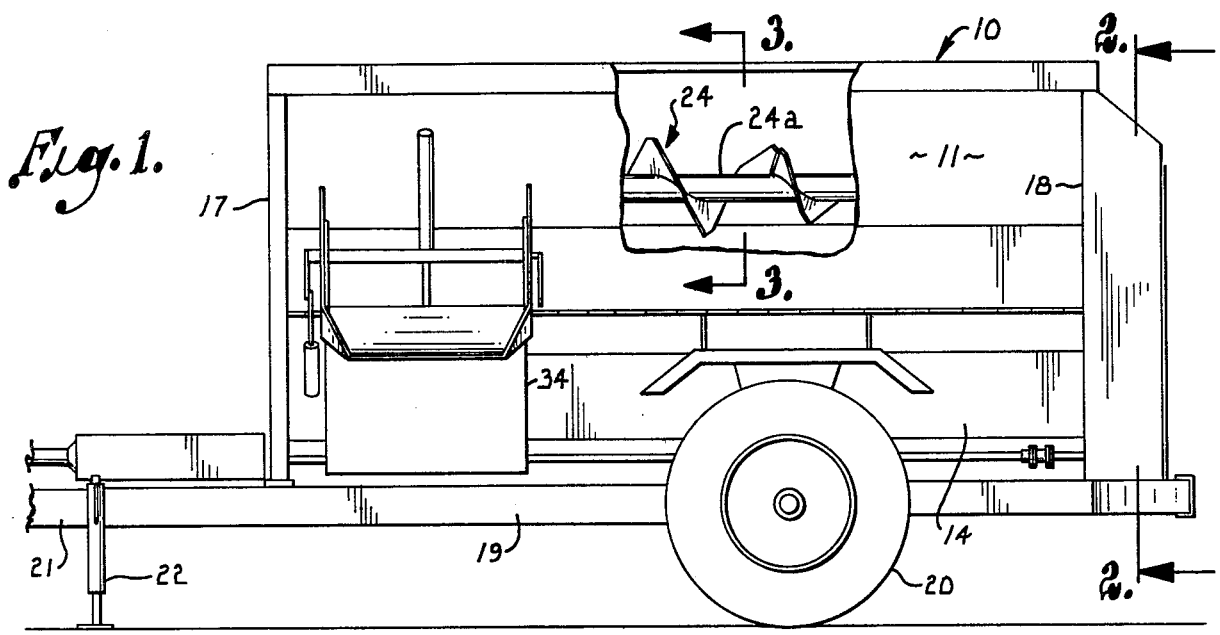
FIG. 1 is a side elevational view of a mobile, trailer type like stock feed mixer incorporating the preferred embodiment of the invention.
Figure 2:
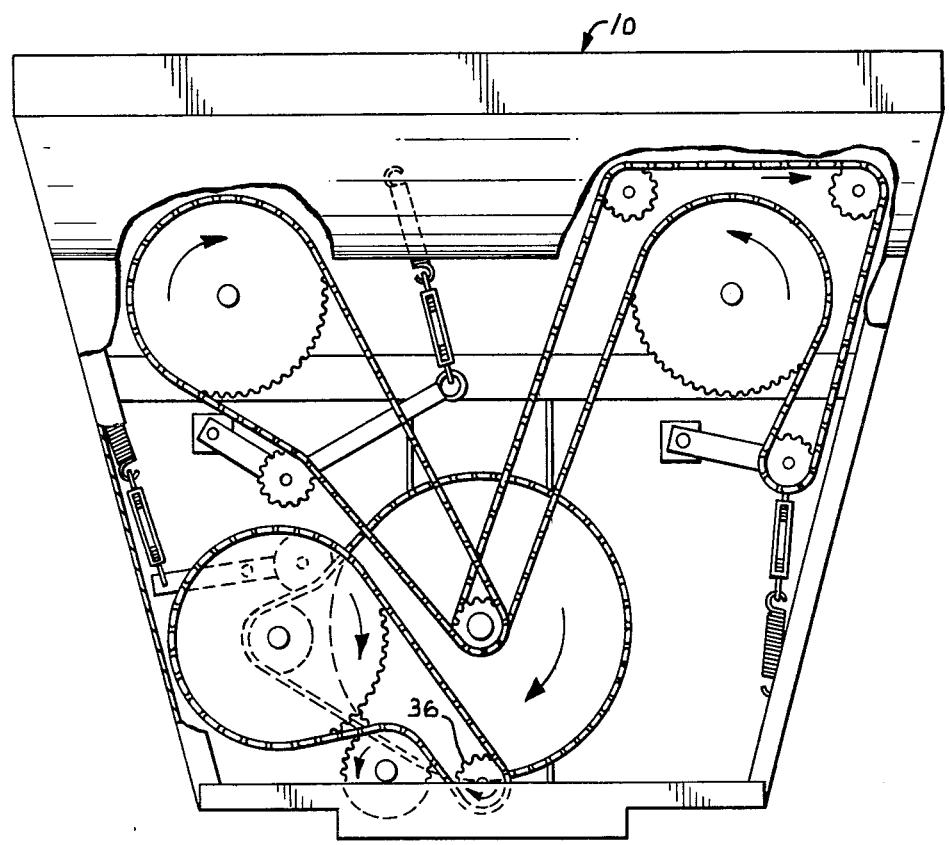
FIG. 2 is a sectional view taken generally along line 2—2 of FIG. 1 in the direction of the arrows.
Figure 3:
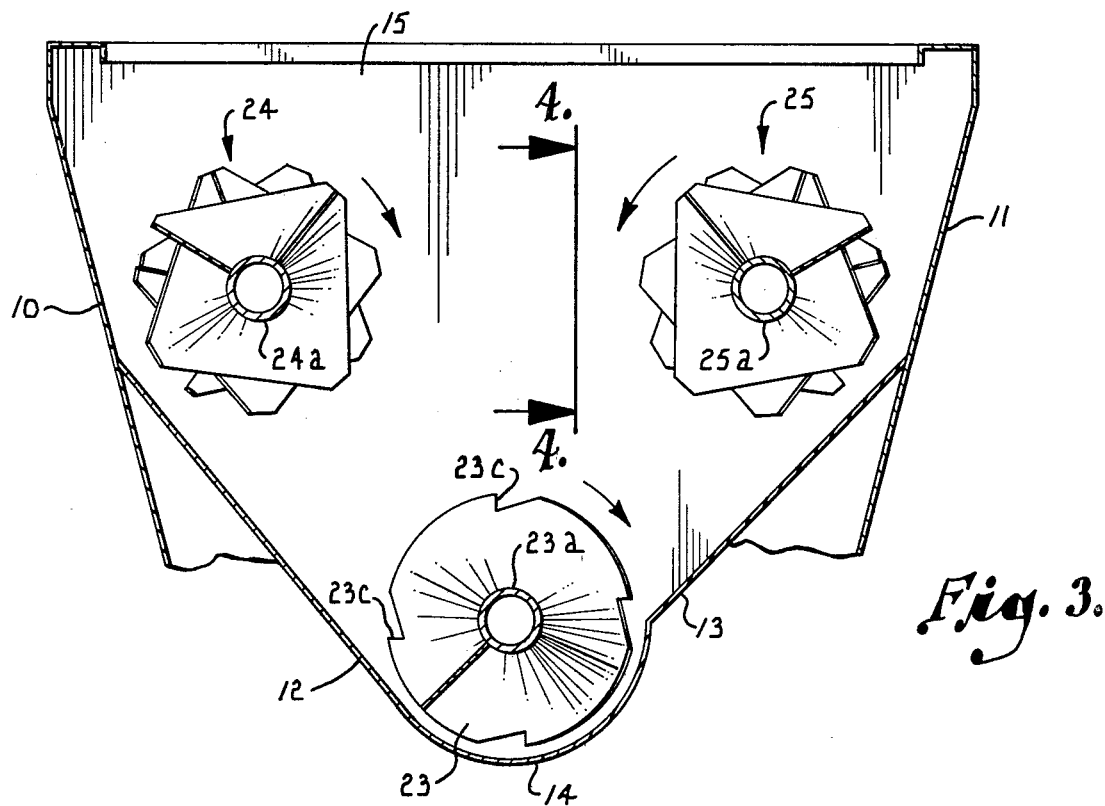
FIG. 3 is a fragmentary sectional view, taken along line 3—3 of FIG. 1 in the direction of the arrows.

Referring now to the drawings and initially to FIGS. 1, 2 and 3, the mixer box has the upper side walls 10 and 11 respectively and the lower converging side walls 12 and 13 connected at their lower with the semicylindrical trough 14. The front and back walls of the box are closed by the front end wall 15, and the rear end wall 16. Front frame members 17 and rear frame members 18 serve to support the box on a chassis 19. The chassis 19 is carried on the ground wheels 20. A tongue 21 is connected with the forward end of the chassis and a temporary rest stand 22, with retractable leg, provides a means for supporting the box in a level stance at times when it is not connected with a draft vehicle (not shown).

The interior of the box contains a bottom auger 23 which fits within trough 14 and extends substantially the full length of the box. Located above the bottom auger and spaced from each other and adjacent to side walls 10 and 11 are the upper augers 24 and 25. The augers 23, 24 and 25 are parallel with one another and have the shafts 23a, 24a and 25a, respectively. The front ends of the auger shafts are supported in suitable bearings, for example bearing 26 (FIG. 4), secured to the inside of the front wall 15 of the box. The rear ends of the shafts are suppported in bearings, for example bearing 27, connected with the rear wall 16 of the box. Each of the auger shafts is provided with a rearward extension 23b, 24b and 25b, respectively, by which they are connected with the auger driving system later to be described.

The bottom auger 23 is basically a conventional helical auger with a uniform radius flighting. However, the edge of the flighting is interrupted at approximately 90 degree intervals by notches providing the generally radially oriented edges 23c, which are arranged to face in the direction of rotation of the auger.

The two upper augers are similar to one another except that since they are counter-rotating, the direction of the flighting on auger 25 is reversed from that of auger 24. Otherwise the description that follows applies to both augers.

Figure 6:
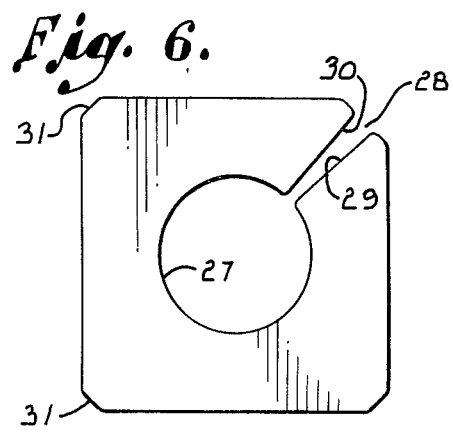
FIG. 6 is a plan view of a blank from which the upper auger flighting sections are made.

The flighting of each upper auger is formed from spiral sections joined end to end and secured to the auger shaft. Each section is formed from a flat blank of steel or other suitable material, the shape of which is shown in FIG. 6. The outline is in the form of a square with material cut out of the square to provide a central circular opening defined by the edge 27. The material is divided from the opening to one corner by slit 28, which defines end edges 29, 30. The corners are preferably flattened as at 31.

The blank is formed into the spiral or helical form by a press. One end of the section is defined by end edge 29 and the other by end edge 30.

The opening in the blank is of a diameter greater than the diameter of the shaft which the flighting sections are to be applied. The dimensional relationship between the diameter of the blank opening, overall dimensions of the blank and radius of the auger shaft is preferably such that when the inner edge 27 of the flighting section is conformed to the surface of the shaft, each corner tip 31 will be angularly offset relative to its proceeding tip by approximately 100° with reference to the shaft axis. The angular relationship of one edge 29 to the opposite end edge 30 is thus equivalent to 400° in terms of continuity of the helix.

For a typical auger using an auger shaft of five inch inside diameter (O.D. 5.563 inches), the dimensions of the blank are 21 7/16 inches square by 5/16 inch thick, with the center opening having a diameter of 5 5/8 inch. When the flighting is applied the edge 27 is conformed to the shaft and welded thereto. This provides the auger with a radius of 12 inches from the shaft axis, or equating it with a conventional helical auger, an "outside diameter" of 24 inches.

Figure 4:
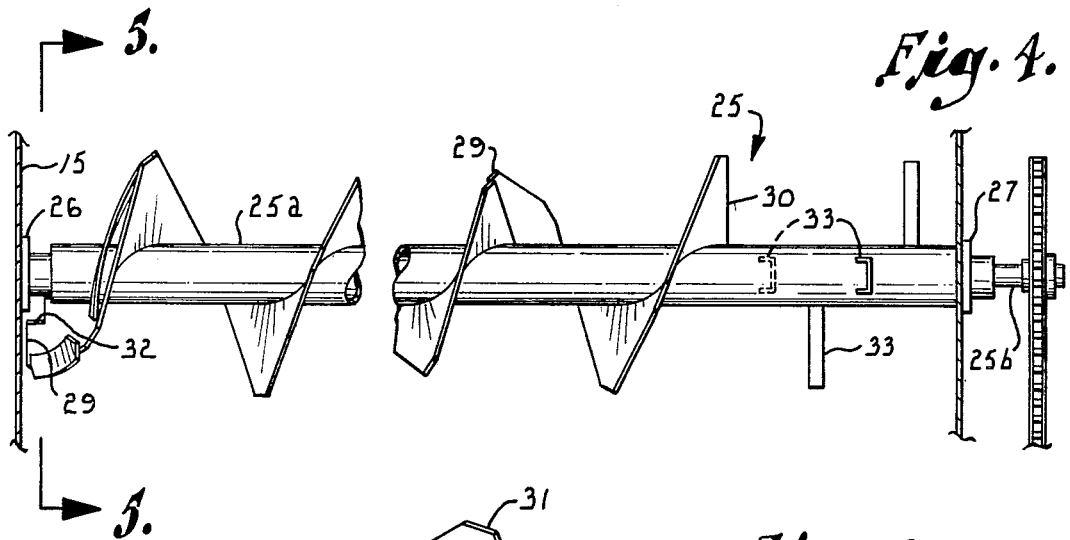
FIG. 4 is a fragmentary side elevational view showing a side view of an upper auger, parts being broken away to represent interrupted length.

The sections of flighting are placed on the shaft in the direction from left to right as viewed in FIG. 4 which is the direction of material movement. Each succeeding section has its end edge 29 slightly overlapping the preceding flight adjacent its end edge 30 thus to provide a continuous flighting surface.

It will thus be understood that the upper augers each provide a flighting in which the outer edge of the flighting is defined by plurality of linear segments providing a series of substantially straight surfaces that are transverse to a radius from the axis of the auger passing through the surfaces and that the surfaces define corners which are distanced, from the auger axis substantially greater than the distance from the axis to the intermediate portions of the edge surfaces. In the preferred arrangement the edge surfaces are perpendicular to a radius from the shaft on through the mid-point of the surface.

Figure 5:
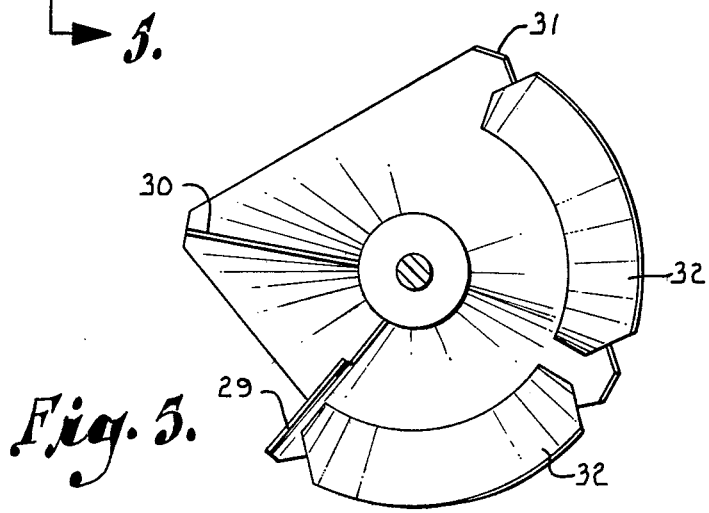
FIG. 5 is a fragmentary sectional view taken generally along line 5—5 of FIG. 4 in the direction of the arrows.

It will be noted from FIGS. 4 and 5 that the endmost flighting section adjacent the wall 15 has its first three corners supplemented by two arcuate flighting extensions 32 which are welded or otherwise securely attached to the flighting. These extensions increase the surface area of the auger in order to assist in clearing material adjacent the front wall 15. It will also be noted that the end edge 29 of this flighting section is located close to the wall and is cut away or notched as at 33 to clear the bearing 26 during rotation.

As again best seen in FIG. 4, the flighting on the upper augers does not extended the full length of the auger. Instead it terminates short of the rear wall 16 to provide an open space on the shaft. Secured to the open space are a plurality or radial beater arms 33. Each arm is preferably a steel part formed as a channel welded at one end to the shaft. The beater arms are staggered and arranged generally in a continuation of the pattern of the helix defined by the flighting or with the beater arms offset at 90° intervals.

Power for driving the auger is supplied from a power take off (not shown) to a power take off shaft extending beneath the box to the rear drive sprocket 36 as seen in FIG. 2. The drive system is described in detail in my U.S. Pat. No. 3,706,442 issued Dec. 19, 1972 and will not be further described here.

The aforementioned patent also describes the lateral discharge conveyer 34 by which material is removed from the box.

In operation the two upper augers serve to move material in a lengthwise direction of the box from the front wall 15 toward the back wall 16. The beater section tends to drive the material downwardly toward the lower auger 23 which in turn tends to move the material in the reverse direction or from the back wall 16 toward the front wall 15. The augers therefore set up a circulating path for the feed which tends to intermix the various feed ingredients with one another in a uniform fashion. The square corners provided in the upper flighting engage the stringy roughage and distribute it in the feed. The notched bottom auger proves roughage mixing in that the shoulder 23c formed therein also tend to engage the stringy roughage and assist in eliminating wedging of the material in the trough 14 between the auger flighting and the trough surfaces.

While the foregoing detailed description is of a preferred embodiment of the invention it will be understood that it is not intended to be limiting. The upper augers may be of the same flighting direction and rotate in the same direction, as shown in my earlier referenced U.S. Pat. No. 3,706,442. More than one bottom auger can be employed. Also, the upper augers may be equipped with reverse flighting to assist the beater sections, the reverse flighting being adjacent the end of the auger with the beater sections being between it and the main auger flighting, and in other combinations with the main flighting, again as disclosed in my prior patent.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A material mixer of the type having a mixing chamber with at least one auger adjacent the bottom of the chamber and a pair of augers above and parallel with said one auger, the improvement wherein:
   each of said augers of said pair has a shaft having a central axis and a flighting attached at its inner edge along said shaft, the outer edge of the flighting defined solely as a plurality of contiguous linear segments providing a series of substantially straight edge surfaces for said flighting that are transverse to a radius from the axis of the auger shaft passing through said edge surfaces, said linear edge surfaces defining corner tips for the auger arranged in a helical pattern extending along the auger.

2. A material mixer as in claim 1, wherein:
   each said surface is substantially perpendicular to a radius from the axis of the auger passing through said edge surface.

3. A material mixer as in claim 1, wherein:
   each pair of adjacent edge surfaces define a corner on the flighting.

4. A mixer as in claim 3,
   the successive corners being spaced from one another relative to said auger axis by at least 90°.

5. A mixer as in claim 3,
   the successive corners being spaced from one another relative to said auger axis by approximately 100°.

6. A mixer as in claim 1,
   said bottom auger having a helical flighting with the edge of the flighting at a constant radial spacing from the axis of the auger,
   said edge being provided at intervals along its length with notches providing a series of incut edges facing in the direction of rotation of the auger.

7. A mixer as in claim 6,
   said notch edges being substantially radial with respect to said shaft axis.

8. A mixer as in claim 6,
   said notch edges being located at approximately 90° intervals along said flighting.

* * * * *